Figure 1:
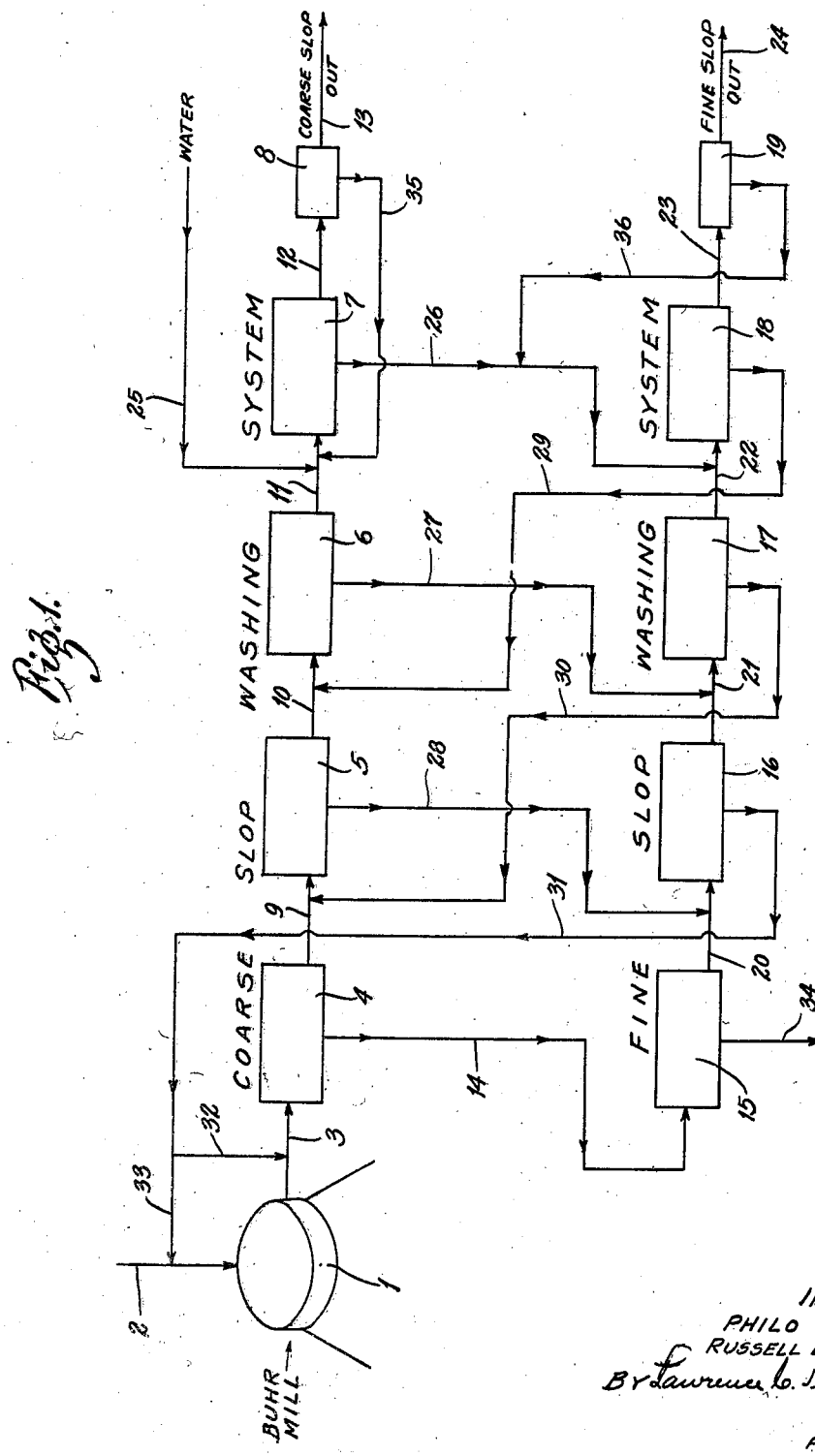

June 25, 1940.  P. R. KING ET AL  2,205,657
CROSS-FLOW SYSTEM
Filed Nov. 29, 1937  2 Sheets-Sheet 1

INVENTORS:
PHILO R. KING,
RUSSELL D. BAKER,
By Lawrence C. Kingsland
ATTORNEY.

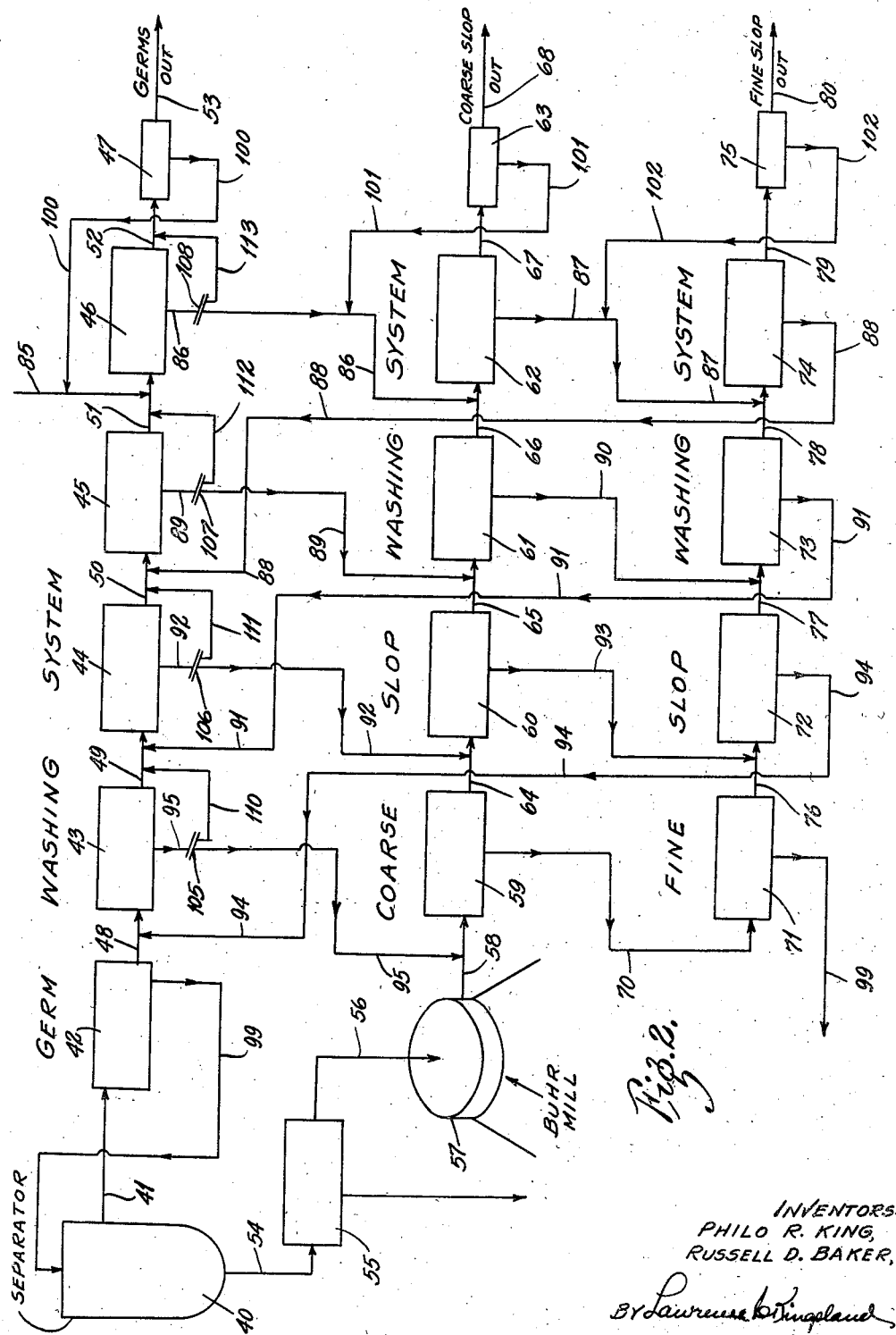

Patented June 25, 1940

2,205,657

UNITED STATES PATENT OFFICE 2,205,657

CROSS-FLOW SYSTEM

Philo R. King, Webster Groves, Mo., and Russell D. Baker, Alton, Ill., assignors to Union Starch and Refining Company, Columbus, Ind., a corporation of Indiana Application November 29, 1937, Serial No. 177,031

10 Claims. (Cl. 127—67)

The present invention relates to washing operations, and in particular to a novel method of cross-flowing water in coarse slop, fine slops and germ washing systems of a starch making process, and in other similar connections.

In the manufacture of starch, or the processing of similar materials, it is customary to grind parts of the grain in a mill, and then to pass the mass through a multiple washing system. Each washing system usually comprises a series of screens, or the like, through which the material is successively passed and wetted with water. Preferably, the water flows so that it is introduced at the last screen of the system and worked toward the first one in opposition to the course of the material being washed, commonly known as the counter-flow principle. The advantage of this is that the freshest water passes over the cleanest material.

Where there are two or more washing systems, such as the germ washing system, the coarse slop washing system and fine slop washing system, it has heretofore been the practice to introduce water from the supply separately to each system.

The present invention provides such a flow that a single supply of water, of a quantity much less than the total normally supplied to all three, may be employed, yet preserving the advantage of the counter-flow principle.

It is accordingly an object of the invention to provide a flow system for a plurality of washing systems so connected between them that a single supply of water may be adequate for all.

It is a further object of the above system to preserve the characteristic counter-flow principle; that is, of supplying the cleanest water to the cleanest material and direct it countercurrently to the flow of the material and successively in the different stages of the washing operations, yet avoiding the necessity of introducing the water into each system.

In the drawings:

Fig. 1 represents a flow system of this type shown with two washing systems; and, Fig. 2 represents a flow system of this type shown including three washing systems.

In Fig. 1, which, for purposes of illustration, is shown on a slop washing system of the type disclosed in copending application Serial No. 177,030, filed November 29, 1937, there is shown a source of supply here represented by a Buhr mill at 1 that receives a supply of grain material from an inflow line 2. An outflow line 3 leads from the Buhr mill to the two washing systems, the first of which is here shown as a coarse slop washing system and the second of which is illustrated by a fine slop washing system.

The coarse slop washing system consists of a series of screens, 4, 5, 6, and 7 (the term being generic, and including any like means), following the last of which is a squeezer 8. The material passes via the line 3 into the screen 4, thence by a line 9 into the screen 5, thence by a line 10 into the screen 6, thence by a line 11 into the screen 7, and from the screen 7 by a line 12 into the squeezer element 8. The coarse slop is then conveyed outward through a conduit 13.

A flow line 14 leads from beneath the screen 4 into the first screen 15 of the fine slop system. This latter system includes successively screens 16, 17, and 18, after which is located a squeezer or filter press 19. The fine slop, having passed through the screen 4 with the water or light starch milk, as will be shown, is conveyed from the top of the screen 15 by a line 20 to the screen 16, thence by a line 21 to the screen 17, thence by a line 22 to the screen 18, and finally by a line 23 to the press 19. From the press it is conveyed out of the system through a line 24.

A pipe 25 is connected to a water supply. In the case of starch processing, this water supply may desirably be brought from the starch washing system, such as shown in the copending application referred to. The pipe 25 is connected into the line 11 ahead of the screen 7. A line 26 leads from beneath the screen 7 to the line 22. A line 27 leads from beneath the screen 6 to the line 21. A line 28 leads from beneath the screen 5 to the line 20. A crossflow line 29 leads from beneath the screen 18 to the line 10. A cross-flow line 30 leads from beneath the screen 17 to the line 9. A crossflow line 31 leads from beneath the screen 16 through a line 32 to the line 3 and with a branch 33 into the line 2. A line 34 leads from beneath the screen 15 out of the slop washing system. A line 35 leads from beneath the squeezer 8 to the line 11 and a line 36 leads from beneath the press 19 to the line 26 and ultimately by line 22 into the screen 18.

The operation of this system is as follows:

A mass of grain material is passed through a line 2 into the Buhr mill 1 wherein it is ground and flows to the first screen 4 of the coarse slop washing system. The fine material then goes through this screen and out the line 14 into the screen 15 of the fine slop washing system. The coarse slop then flows successively through the screens 5, 6, and 7, as will be evident, and ultimately to the squeezer 8 and out the line 13. The fine material passes from the screen 15 through the screens 16, 17, and 18, then to the press 19, and finally out the line 24.

The water is introduced through the line 25 and flows first into the line 11 and through the screen 7, which is the last screen of the coarse slop washing system. In this screen it washes the coarse slop therein which, as will be evident, is the cleanest of the coarse slop. The slop itself flows on through the line 12 to the squeezer 8 and any water obtained in the squeezer flows back through the line 35 back into the screen 7.

The water from the screen 7, with any starch taken into suspension, then flows down by line 26 to the line 22 and into the last screen 18 of the fine slop washing system. Therein it washes the cleanest of the fine slop, which slop then flows through line 23 to the press 19. The water extracted by this press then flows back through the line 36 to the line 26 and then back into the screen 18.

The water flowing through the screen 18 with its suspended starch passes by the cross-flow line 29 back up to the line 10 where it enters the screen 6 that is the next to cleanest of the coarse slop washing screens. It passes through this screen, washing the slop and taking up starch therefrom, and by the line 27 flows down to the line 21 and into the screen 17 that is the next to cleanest screen of the fine slop system.

After washing the slop in the screen 17, it flows through that screen and by the cross-flow line 30 to the line 9 and into the second dirtiest screen 5 of the coarse slop washing system. After washing this slop, it flows through the screen 5 and by the line 28 to the line 20 and into the screen 16 of the second dirtiest fine slop. In the screen 16, it washes the slop and, flowing through the screen, passes by the cross-flow line 31 to the branch 32 into the first dirtiest screen 14 of the coarse slop washing system. A small amount of the water also goes through the branch 33 into the line 2 and to the Buhr mill to assist in the operation of the latter.

In the screen 4, the water washes the coarse slop and assists in separating the fine slop and conveying it through the line 14 into the first screen 15 of the fine slop washing system. From this first screen, after having washed the slops therein, the water with the starch it has picked up in passing through the several screens flows out the line 34. It may then be used in some other part of the process as disclosed in the copending application referred to. During the washing, the water takes up starch material and becomes known as light starch milk.

In the type shown in Fig. 2, three washing systems are illustrated and the invention applied to them. In this type, a germ separator of the usual kind is shown at 40, from which the germs are carried by a line 41 to the germ washing system, here shown as including a series of screens 42, 43, 44, 45, and 46 followed by some form of dehydrator such as a squeezer 47. It will be understood that the germs are caused to flow from the screen 42 through the line 48 to the screen 43; thence through line 49 to the screen 44; thence through line 50 to the screen 45; thence through line 51 to the screen 46; by line 52 to the element 47; and finally out through the line 53.

The remaining materials are brought from the separator through a suitable line 54 and may undergo intermediate processing in the device 55, which may be some sort of screen. From the device 55 they flow through the line 56 into the Buhr mill 57. From the Buhr mill the materials are transmitted through a line 58 to the coarse slop washing system that includes screens 59, 60, 61, and 62 and finally a dehydrating means, such as squeezer 63. Materials flow from the screen 59 to the screen 60 through a line 64; from the screen 60 to the screen 61 through a line 65; from the screen 61 to the screen 62 through a line 66; from the screen 62 to the squeezer 63 through a line 67 and finally out through a line 68.

Since the finer material flows through the relatively coarse screens of the coarse slop washing system, this material will separate out at the screen 59, flowing through a line 70 into the fine slop washing system that includes the screens 71, 72, 73, and 74 and the final press 75. The fine slop flows from the screen 71 to the screen 72 through the line 76; from the screen 72 to the screen 73 through the line 77; from the screen 73 to the screen 74 through the line 78; from the screen 74 to the press 75 through a line 79 and finally out through a line 80.

The flow of water includes the following: a line 85 from some outside source brings in clean water to the line 51 ahead of the last screen 46 of the germ washing system. This water flows through the screen 46, washing the material therein, and thence out by a line 86 into the line 66, whereupon it flows through the screen 62. From this screen it passes through the line 87 into the line 78 and into the screen 74. From this point, it cross-flows through the line 88 back up into the line 50 ahead of the penultimate or next to last screen 45 of the germ washing system. After passing through this screen it flows out through the line 89 into the line 65 and through the screen 61 of the coarse slop washing system. Having passed through this screen, it then flows out through the line 90 into the line 77 and through the screen 73. From this screen it flows by cross-flow line 91 back up into the line 49 leading into the screen 44 of the germ washing system. After flowing through this screen it leaves by the line 92 to enter the line 64 and flow through the screen 60 of the coarse slop system and thence by the line 93 into the line 76 and through the screen 72 of the fine slop washing system. From this screen it passes by a line 94 into the line 48 and through the screen 43 of the germ washing system. From this screen it flows through a line 95 into the line 58 and thence, together with the fine slop, it flows through the screen 59 of the coarse slop system, and by the line 70 into and through the screen 71 of the fine slop system. It then flows out through a line 98.

As is familiar in the art, the starch milk from the first screen 42 of the germ washing system is directed back into the separator 40 through a line 99. In addition to the above, water extracted from the germ in the squeezer 47 is conveyed by a line 100 back up into the line 85. Also water extracted from the coarse slop in the squeezer 63 is conveyed back by a line 101 into line 86 and water extracted from the fine slop in the press 75 is conveyed back by line 102 into line 87.

As a matter of precaution, screens may be employed to prevent loss of any germs that may escape through the germ washing screens. Such screens are shown at 105, 106, 107, and 108 in the lines 95, 92, 89, and 86, respectively. The germs that may be separated by these screens are returned to the germ washing system as follows: from screen 105 by a line 110 to the line 49, from the screen 106 by a line 111 to the line 50, from the screen 107 by a line 112 to the line 51, and from the screen 108 by the line 113 to the line 52.

The operation of the system of Fig. 2 is as follows:

The material in the separator 40 usually consists of hulls, grits, and germs from the broken corn kernels, together with sufficient starch milk to maintain such a specific gravity that the germs float over a top wall thereof into the line 41 and into the first screen 42 of the germ washing system. The hulls and grits in starch milk mixture pass out the line 54 into the processing device 55 where certain elements may be removed, such as pointed out in the copending application referred to. The remaining products consisting chiefly of hulls pass into the Buhr mill 57 through the line 56 wherein they are ground and broken up further so as to free as completely as possible all of the starch. From the Buhr mill the slops pass through line 58 into the screen 59 of the coarse slop washing system.

The flow through these several systems is produced by supplying water to them. It is understood that sufficient starch milk from the separator and the Buhr mill is present to institute the flow of the several products.

When water is introduced into the line 85 it passes through the screen 46 which contains the cleanest germ. The water at this time is at its cleanest. From the screen 46 the water then flows via the lines 86 and 66 into the screen 62 that contains the cleanest coarse slop. From this screen the water flows via the lines 87 and 78 into the screen 74 wherein are the cleanest fine slops. In this manner the cleanest water always is applied to the cleanest products.

The subsequent flow of the water from the screen 74 takes it by a cross-flow line 88 and line 50 into the penultimate screen 45 of the germ washing system where it washes the slightly less clean germs therein. As will be understood from the foregoing description, the water then successively flows through the penultimate devices of the coarse and fine slop washing systems to wash the slightly less clean products in them and thereafter reaches the dirtiest products in all three systems. In the line 98 the water will be laden with the maximum quantity of starch washed from the materials of the three systems and may be conducted to any suitable place for its re-use.

Modifications of the system are obvious. It requires a certain amount of water for washing a certain quantity of product in each washing system separately. By this system, substantially less water is successively applied to each screen but always preserving the relatively clean water for the relatively clean products. Thus where separate water was supplied for each system the total quantity of water would be substantially greater than the quantity here used, since the same water is passed successively through all systems.

It is obvious that the invention is not limited to treatment of germs and slops in starch manufacture, or to any particular combination or sequence of the systems shown, and that any washing operation involving successive treatment by a fluid is within its scope as defined by the claims to follow.

What is claimed is:

1. In a method of washing materials in a plurality of washing systems, the steps of passing the materials in each system successively through a series of devices in which they may be washed, supplying a washing medium into one device of the first system, thence through said device to a device of each of the other systems, from the last such device returning it to a preceding device of the first system, and thereafter directing said medium to cross-flow from one system to another so as to cause it to wash materials in all systems, and in so doing making it flow through the remaining devices of all of the systems.

2. In a method of washing materials in a plurality of washing systems, the steps of passing the materials in each system successively through a series of devices in which they may be washed so that the materials in the later devices in each system are more washed than in earlier ones, introducing water into one of the later devices of one system, causing the water to flow through later devices of all systems, then directing it into an earlier device of one system, and causing it to cross-flow from one system to another so as to wash materials in all systems until it reaches the earliest devices.

3. In a method of washing materials in a plurality of washing systems, the steps of passing the materials of each system through a series of devices in which they may be washed so that materials in the last device of each system are the cleanest, introducing a washing medium into a later device of one system to flow therethrough, then conducting it through the last device of each other system successively, thereafter directing it back to the penultimate device of the first system and successively through the corresponding devices of the other systems.

4. In a method of washing materials in at least two washing systems, the steps of passing the materials of each system successively through a series of devices, supplying water from a single source to one of said devices of the first system, passing it through said device to a device of the second system, thence passing it back to a prior device of the first system, and through the same to a prior device of the second system.

5. In a method of washing materials in at least two washing systems, the steps of gradually washing the material in each system by passing it successively through a series of screens, supplying water at a single point for effecting the washing in all systems, and directing the water through the systems to flow through later screens of all systems successively before passing into the earliest screen of any, and thereafter to cross-flow from one system to another through the earlier screens of all systems so as to apply the water in the several systems to materials substantially correspondingly dirty.

6. In a method of washing corn starch slops, the steps of grinding the slops, directing them to a first screen of a series of coarse screens constituting a coarse slop washing system, directing the fine slops that pass through said first coarse screen into a first fine screen of a series constituting a fine slop washing system, directing the slops through the screens of their respective systems, and washing them in each, introducing water into the last screen of one system to flow over the slop therein and through the screen, passing it thence into and through the last screen of the other system to wash the slop therein, thence conveying it back to a previous screen in the original system to repeat the direction of flow until all of it passes through all the screens of both systems.

7. In a method of washing materials in two washing systems, the steps of directing the material in each system through a series of screens and finally to a water removing device, introducing water into one of the systems at the last screen thereof, and then directing that water from one system to the other successively backward to the first screen of one of them, and directing the water from each water removing device back into the system.

8. In a method of washing materials in a plurality of washing systems each consisting of a series of washing devices, the steps of passing the materials in each system successively through the devices of that system, supplying water adjacent a later screen of one system and thereafter causing it to flow in series through all the systems counter to the direction of flow of the materials being washed in such systems, and directing the water from one system to another over the relatively clean materials in each system before it is directed over the relatively dirty materials in any system.

9. In a method of washing materials in a plurality of washing systems each consisting of a series of washing devices, the steps of passing the materials for washing successively through the devices in each system, supplying a predetermined quantity of water to one system and thereafter directing said predetermined quantity to flow in at least two of the systems, and directing the water counter to the flow of materials in such systems, the said predetermined quantity of water being directed through a plurality of devices in at least one system, and at least substantially completing the washing in said system, and being conveyed from one system into the other at such point that its degree of dirtiness from the first system approximates the degree of dirtiness of the point in the second system into which it is introduced, and thereafter being directed through the remaining part of the second system.

10. In a method of washing materials in a plurality of washing systems, the steps of gradually washing the material in each system by passing it through a series of washing devices, supplying a washing medium into the last device of the first system and passing it therethrough, thereafter returning the medium to the last device of the second system, thereafter passing the medium into the next-to-last device of the first system, and from the next-to-last device of the first system passing it to the next-to-last device of the second system, and from the next-to-last device of the second system passing the medium to the third-to-last device of the first system, and from the third-to-last device to the first system, passing the medium to the third-to-last device of the second system, and from the third-to-last device of the second system, passing the medium into the fourth-to-last device of the first system, and from the fourth-to-last device of the first system, passing the medium into the fourth-to-last device of the second system.

PHILO R. KING.
RUSSELL D. BAKER.